(12) United States Patent
Hartlaub (10) Patent No.: US 8,240,756 B2
(45) Date of Patent: Aug. 14, 2012

(54) BACKREST HAVING A HEADREST, VEHICLE SEAT EQUIPPED WITH THE LATTER, AND ASSEMBLY METHOD

(75) Inventor: Silvio Hartlaub, Pulheim (DE)

(73) Assignee: Johnson Controls GmbH, Burscheid (DE)

( * ) Notice: Subject to any disclaimer, the term of this patent is extended or adjusted under 35 U.S.C. 154(b) by 461 days.

(21) Appl. No.: 12/302,684

(22) PCT Filed: Mar. 9, 2007

(86) PCT No.: PCT/EP2007/002047
§ 371 (c)(1),
(2), (4) Date: May 14, 2009

(87) PCT Pub. No.: WO2007/121809
PCT Pub. Date: Nov. 1, 2007

(65) Prior Publication Data
US 2009/0315370 A1    Dec. 24, 2009

(30) Foreign Application Priority Data

Apr. 21, 2006 (DE) .......................... 10 2006 019 176

(51) Int. Cl.
*B60N 2/427* (2006.01)
(52) U.S. Cl. ............................... 297/216.12; 297/216.13
(58) Field of Classification Search ............. 297/216.12, 297/216.14, 216.13
See application file for complete search history.

(56) References Cited

U.S. PATENT DOCUMENTS

| | | | |
|---|---|---|---|
| 5,823,619 A | 10/1998 | Heilig et al. | |
| 6,523,902 B2* | 2/2003 | Robinson | 297/216.12 |
| 6,824,212 B2* | 11/2004 | Malsch et al. | 297/216.12 X |
| 7,641,280 B2* | 1/2010 | Uno et al. | 297/216.12 |
| 2002/0074843 A1 | 6/2002 | Malsch et al. | |

FOREIGN PATENT DOCUMENTS

| | | |
|---|---|---|
| DE | 10041528 A1 | 7/2002 |
| DE | 10054826 C2 | 4/2003 |
| DE | 102005045045 A1 | 3/2007 |
| DE | 102006019176 A1 | 10/2007 |

* cited by examiner

*Primary Examiner* — Anthony D Barfield
(74) *Attorney, Agent, or Firm* — Butzel Long (57) ABSTRACT

A backrest (3), in particular for a motor-vehicle seat (1), has a headrest (4), of which at least one part can be displaced from at least one use position towards the head of the occupant into a safety position. Here, an actuating device (11) is provided which is arranged in the backrest and is operatively connected to a drive device (8) by means of a mechanical transmission means (9) for the displacement of at least one part of the headrest. According to the invention, the transmission means (9) has a first segment (12) which is assigned to the actuating device (11) and a second segment (12') which is assigned to the drive device (8), which segments can be operatively connected to one another by means of a coupling device (13). Furthermore, the invention relates to a vehicle seat which is equipped with said backrest and to an assembly method.

12 Claims, 8 Drawing Sheets

BACKREST HAVING A HEADREST, VEHICLE SEAT EQUIPPED WITH THE LATTER, AND ASSEMBLY METHOD

The invention relates to a backrest, in particular for a motor vehicle seat, having a headrest of which at least one subsection can be shifted from at least one position of use toward the seat occupant's head into a safety position, and having an actuating device which is arranged in the backrest and is operatively connected by means of a mechanical transmission means to a driving device for shifting at least one subsection of the headrest, and, furthermore, to a vehicle seat equipped with a headrest, and to an assembly method.

PRIOR ART

A backrest of the generic type is known from the publication WO 2005/097545 A2. The backrest is provided with a headrest which is connected to the backrest in a height-adjustable manner via holding rods and has a rear basic body and a front cushion element. In the event of a rear impact, the cushion element is shifted forward toward the seat occupant's head under the action of the inertia of said seat occupant who is pressed into the backrest, and prevents the cervical vertebrae from overextending (whiplash trauma). The seat occupant's mass in this case acts on an actuating means which is arranged in the lower region of the backrest, is connected mechanically by means of a Bowden cable, which is guided through the holding rods, to a driving device for the cushion element of the headrest and transmits the rearwardly directed shifting of the actuating means toward the driving device as a tensile movement of the core of the Bowden cable relative to the sheath thereof. The tensile movement of the core is converted there into a forwardly directed shifting of the cushion element.

The safety system known from WO 2005/097545 A2 considerably reduces the risk of injury for the seat occupant and is furthermore robust and cost-effective. However, the assembled unit comprising headrest and backrest is relatively bulky, in particular in conjunction with the seat part of the vehicle, and is therefore capable of improvement with regard to transportation and assembly in the vehicle.

PROBLEM

The invention is based on the problem of improving the handleability of a backrest according to the invention without having an adverse effect on the advantages of the previously known safety device.

SOLUTION

According to the invention, the problem is solved in the case of a headrest of the type mentioned at the beginning in that the transmission means has a first segment assigned to the actuating device and a second segment assigned to the driving device, said segments being operatively connectable to each other by means of a coupling device. The problem is furthermore solved by means of a vehicle seat equipped with said backrest, and an assembly method in which a first segment of the transmission means is attached to the actuating device and a second segment of the transmission means is attached to the driving device, and the first and second segments of the transmission means are coupled to each other only over the course of assembling the headrest on the backrest, for example in the vehicle interior.

The dependent claims relate to preferred embodiments of the invention.

FIGURES

The figures illustrate various embodiments of the invention by way of example and schematically.

In the figures.

Figure 1:
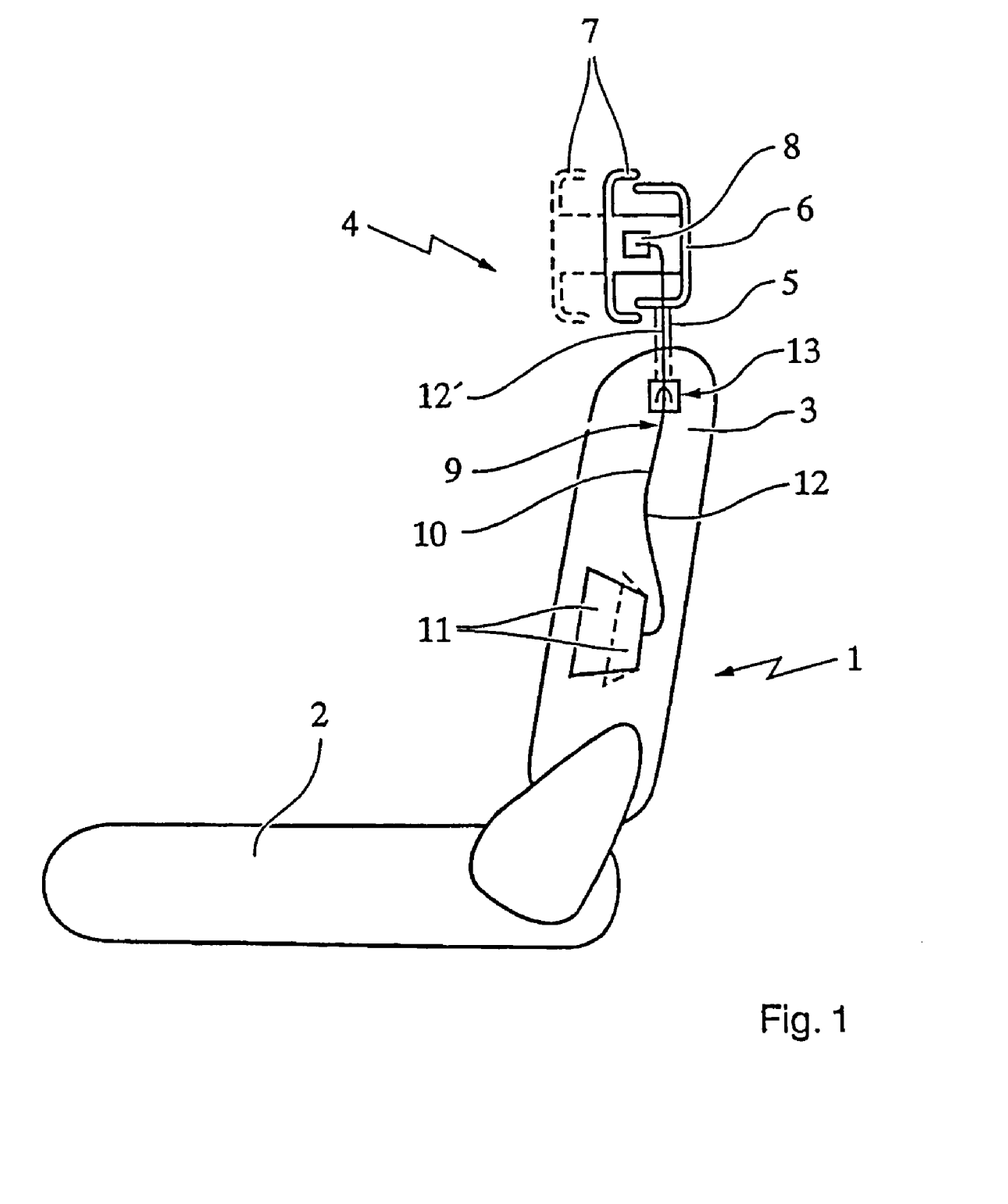
FIG. 1 shows a motor vehicle seat having a backrest designed according to the invention.

The motor vehicle seat 1 illustrated in FIG. 1 comprises a seat part 2 and a backrest 3 which is provided with a headrest 4. The headrest 4 is connected via holding rods 5 to the metal structure of the backrest 3 and can be adjusted in height into various positions of use by displacement of the unit comprising holding rods 5 and headrest 4 relative to the backrest 3. However, the invention can fundamentally also be used in the case of backrests 3 in which the height adjustment takes place in a different manner, for example by displacement of the headrest 4 in relation to the holding rods 5.

The headrest 4 comprises a rear basic body 6 connected fixedly to the holding rods 5, and a front cushion element 7 which can be shifted (dashed illustration) forward out of the position of use shown in the direction of the seat occupant's head. The shifting is brought about by means of a driving device 8 which is connected by means of a mechanical transmission means 9, which is guided through the holding rods 5 and is in the form of a Bowden cable 10, to an actuating device 11 in the lower region of the backrest 3. The actuating device 11 is shifted to the rear (dashed illustration) by the seat occupant's body, with tension being exerted on the transmission means 9. Said tensile movement is transmitted by the Bowden cable 10 toward the driving device 8 and is converted there into a displacement of the cushion element 7.

With regard to the operation of a suitable driving device, reference is expressly made to the cited publication WO 2005/097545 A2. An actuating device which can be used in order to carry out the invention is disclosed, for example, in patent application DE 10 2004 048 910.6.

The Bowden cable 10 is divided in the lower region of the holding rods 5 into a first segment 12 connected to the actuating device 11 and a second segment 12' attached to the driving device 8. Below the holding rods 5, a coupling device 13 which is suitable for the mechanical connection of the segments 12, 12' is provided in the backrest 3. The motor vehicle seat 1 is provided without a headrest 4 and is placed into the vehicle interior. Only subsequently is the operative connection of actuating device 11 and driving device 8 made by the coupling device 13.

The coupling device 13 which is shown in FIG. 2 and is provided for the single connection of the segments 12, 12' comprises, on the backrest side (FIG. 2a), a cage 14 which is latched releasably to the lower end of the headrest sleeve 15 which subsequently receives the holding rod 5 and is secured in the backrest 3. A coupling 16 is provided in the cage 14, said coupling receiving the core 17 of the lower segment 12 of the Bowden cable 10 and being tensioned upward in relation to the cage 14 by means of a spring 18. The sheath 19 of the segment 12 is supported on the lower side of the cage 14. Cage 14 and coupling 16 are respectively provided on their upper side with openings 20, 21 which are oriented coaxially with respect to the hole 22 in the headrest sleeve 15 and through which the counterpart of the coupling device 13, which counterpart is described below on the headrest side, can be inserted.

Figure 2A:
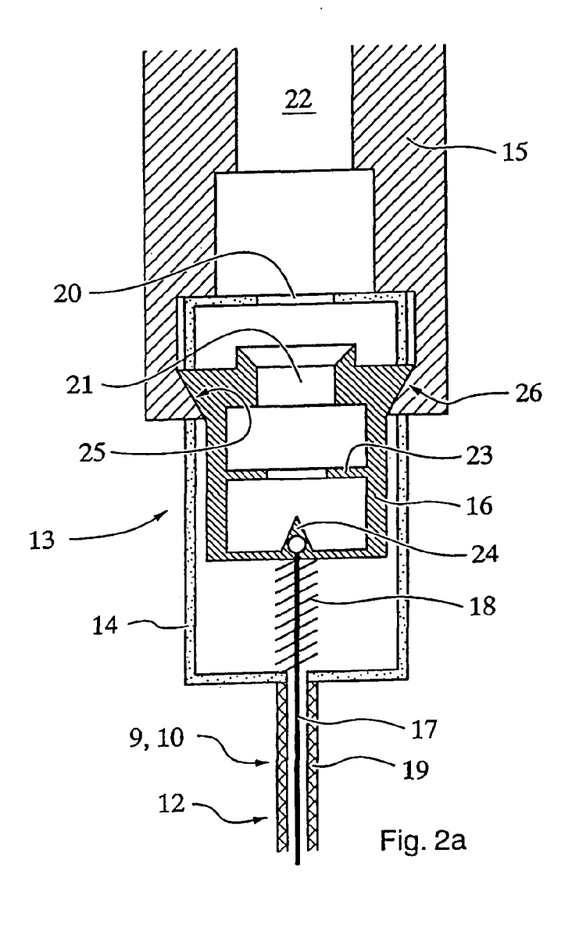
FIG. 2 shows a transmission device suitable for the single, self-finding connection of the segments of the transmission means.
Figure 2B:
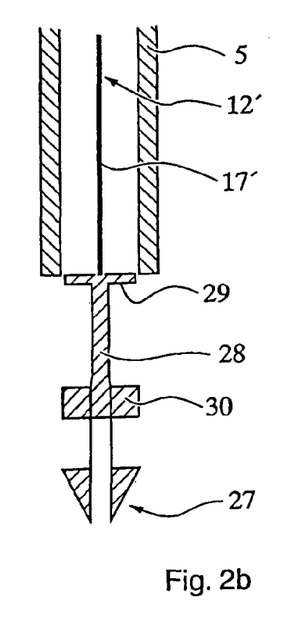
Figure 2C:
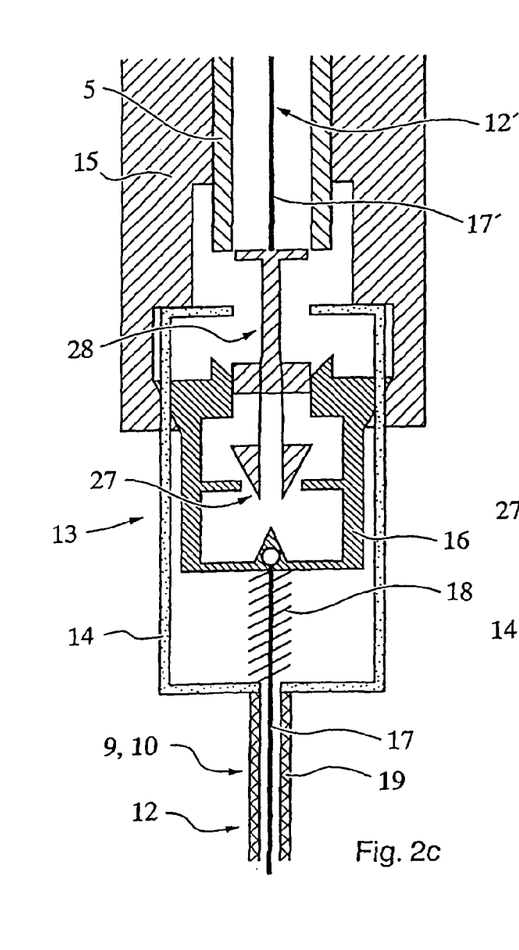

In the interior, the coupling 16 has a collar 23 and an expanding cone 24 which are likewise in a line with the axis of the hole 22. In its upper outer circumference, the coupling 16 is furthermore provided with oblique surfaces 25 which, in the pre-assembled state, bear against corresponding oblique surfaces 26 of the headrest sleeve 15 in such a manner that, in the event of a downwardly directed loading of the coupling 16, a tension which compresses said coupling, i.e. is directed inward, is produced.

On the headrest side (FIG. 2b), the coupling device 13 comprises a hook 27 which can be expanded by means of spreading, but also can be compressed resiliently and is connected to the core 17' of that segment 12' of the Bowden cable 10 which is assigned to the driving device 8. The hook 27 and a guide device 28 having upper and lower annular projections 29, 30, which are oriented coaxially with respect to the core 12, and the holding rod 5, project downward out of the holding rod 5. The sheath (not shown) of the Bowden cable 10 is supported further above on the holding rod 5.

Figure 2D:
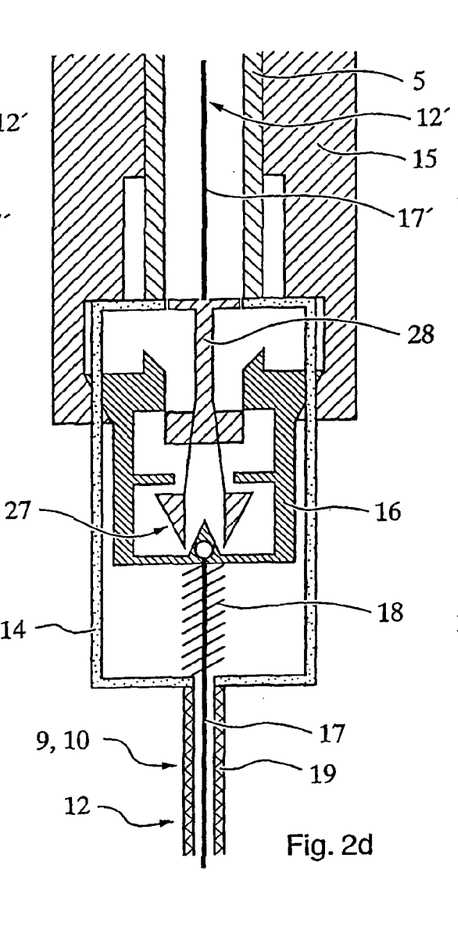
Figure 2E:
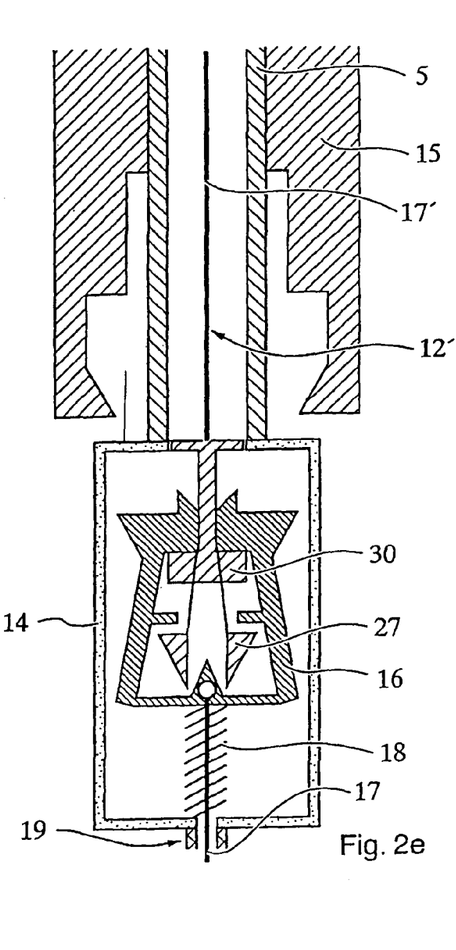

When the holding rod 5 is pushed into the hole 22 in the headrest sleeve 15 (FIG. 2c), hook 27 and guide device 28 penetrate in a self-finding manner through the openings 20, 21 into the coupling 16 until the hook 27 is expanded by the spreading wedge 24 and engages behind the collar 23 of the coupling 16 (FIG. 2d). Upon further displacement of the holding rod 5, coupling 16 and cage 14 are released from the headrest sleeve 15 by the holding rod 5, with the oblique surfaces 25, 26 compressing the upper part of the coupling 16 in such a manner that the lower annular projection 30 of the guide device 28 is enclosed nonreleasably (FIG. 2e) The coupling 16 now couples the cores 17, 17' of the segments 12, 12' mechanically to each other and is capable of transmitting a tensile movement of the lower core 17 to the upper core 17' by means of a movement relative to the cage 14 with compression of the spring 18.

During a height adjustment of the headrest 4, the holding rod 5 is displaced further downward together with the coupling device 13 in relation to the headrest sleeve 15. By this means, the operation of the coupling device 13, which furthermore bears against the lower side of the holding rod 5, is not impaired.

The coupling device 13 according to FIG. 3 is designed in such a manner that a subsequent removal and refitting of the headrest 4 are possible. The substantial difference over the apparatus described previously is that the coupling 16 is designed as an outwardly prestressed, upwardly open leg spring 31 which is provided with latching means 32 (merely indicated) for the releasable bracing of the legs of the leg spring 31. Furthermore, leg spring 31 and headrest sleeve 15 each have pairs of oblique surfaces 25, 25', 26, 26' in such a manner that, upon a downwardly directed displacement of the coupling 16 relative to the headrest sleeve 15, the leg spring 31 is compressed with fixing by means of the latching means 32 and, in the case of an upwardly directed displacement, the leg spring 31 is expanded again with the latching means 32 being released (FIG. 3a). The counterpart of the coupling device 13, which counterpart is shown in FIG. 3b and is on the headrest side, comprises a simple tab 33 with a transverse hole 34 into which inwardly projecting projections 35 of the leg spring 31 can engage.

Figure 3A:
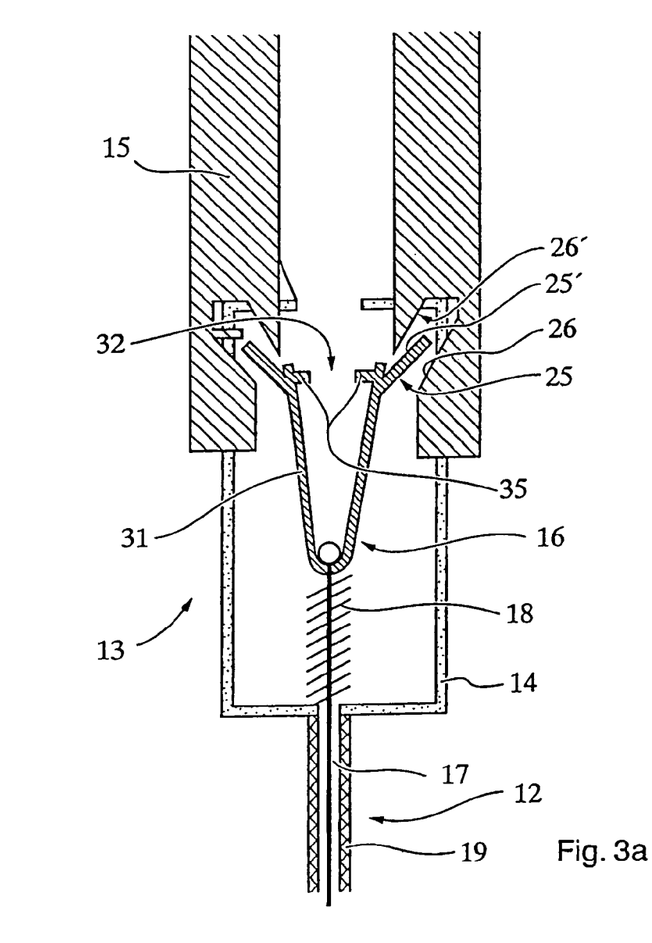
FIG. 3 shows a similar device, but suitable for multiple assembly and removal of the headrest.
Figure 3B:
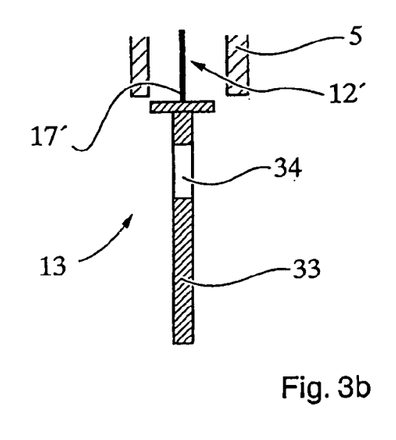
Figure 3C:
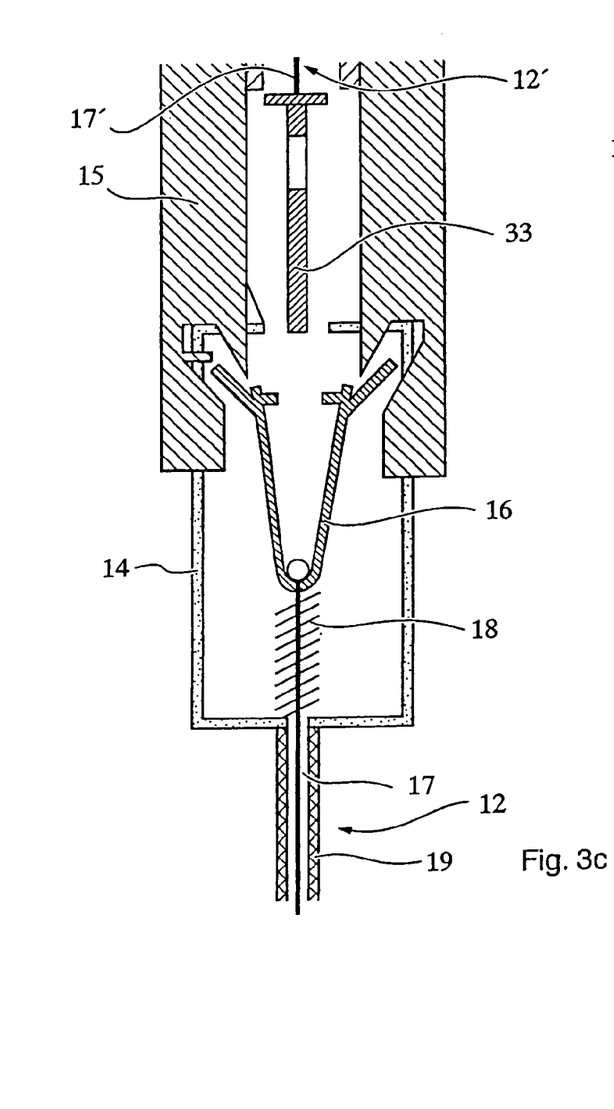
Figure 3D:
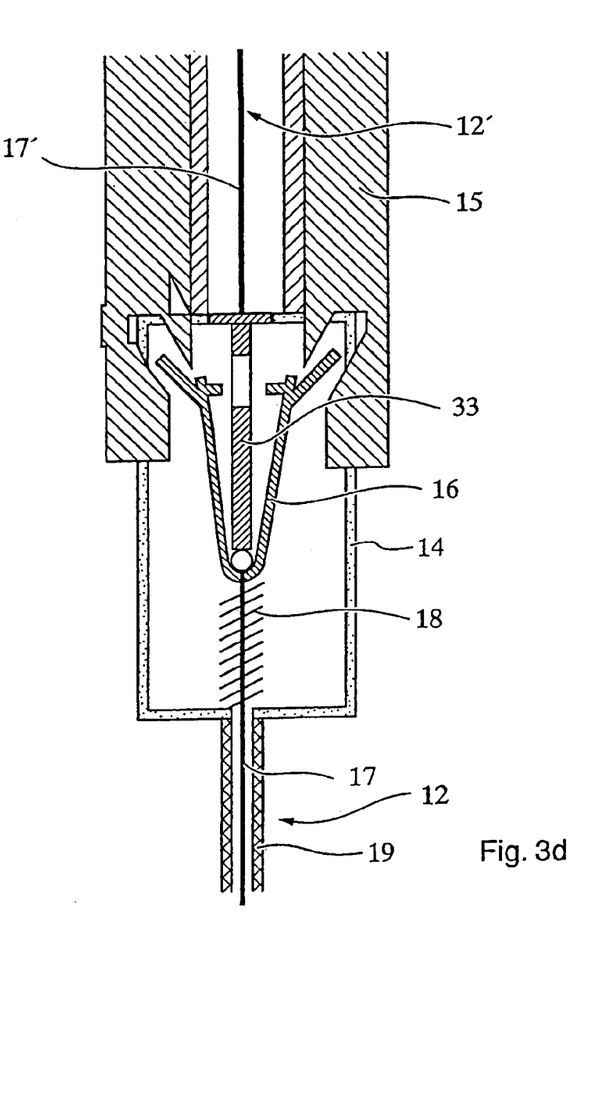
Figure 3E:
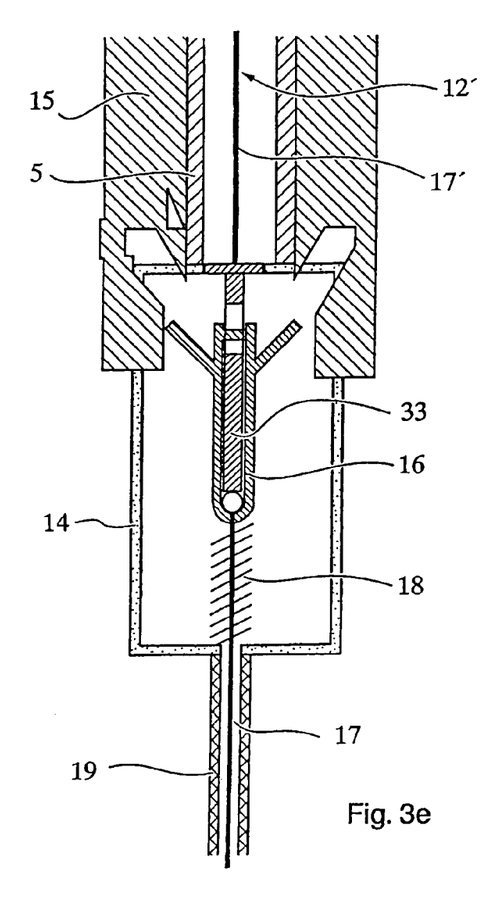
Figure 3F:
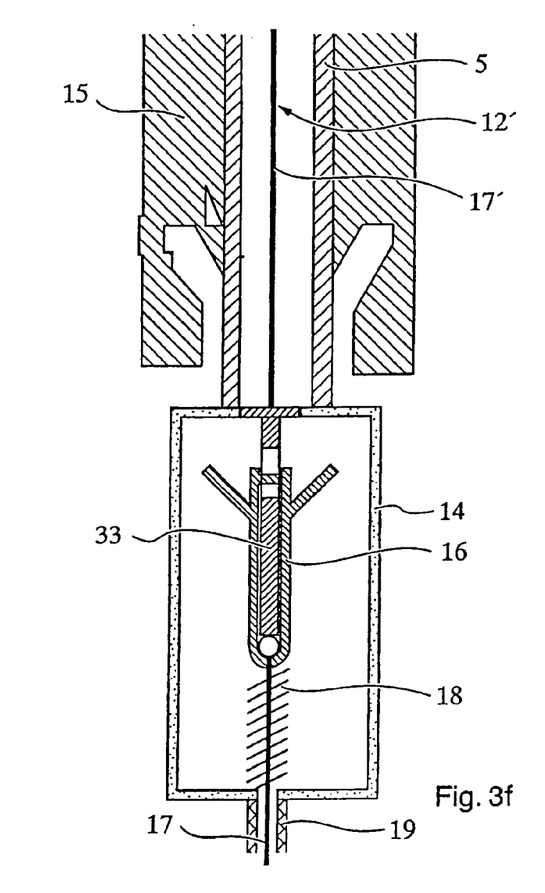

Upon insertion of the holding rod 5 into the hole 22 in the headrest sleeve 15 (FIG. 3c), the tab 33 is introduced into the leg spring 31 until the transverse hole 34 of the tab 33 overlaps with the projections 35 of the leg spring 31 (FIG. 3d). Upon further pushing in of the holding rod 5, the cage 14 holding the coupling 16 is released reversibly from the headrest sleeve 15, with the oblique surfaces 25, 26 closing the leg spring 31 in a latching manner. Tab 33 and leg spring 31, and therefore also the cores 17, 17' of the Bowden cable 10, are subsequently connected mechanically to one another (FIG. 3e) Upon further pushing in of the holding rod 5, the cage 14 is released from the headrest sleeve 15.

If the holding rod 5 is pulled out of the headrest sleeve 15 upon subsequent removal of the headrest 4, the oblique surfaces 25', 26' expand the leg spring 31 again, as a result of which the connection thereof to the tab 33 is released. In the process, the cage 14 is latched again in its initial position in the headrest sleeve 15. The coupling device 13 is once again in the starting position according to FIGS. 3a and 3b.

Figure 4:
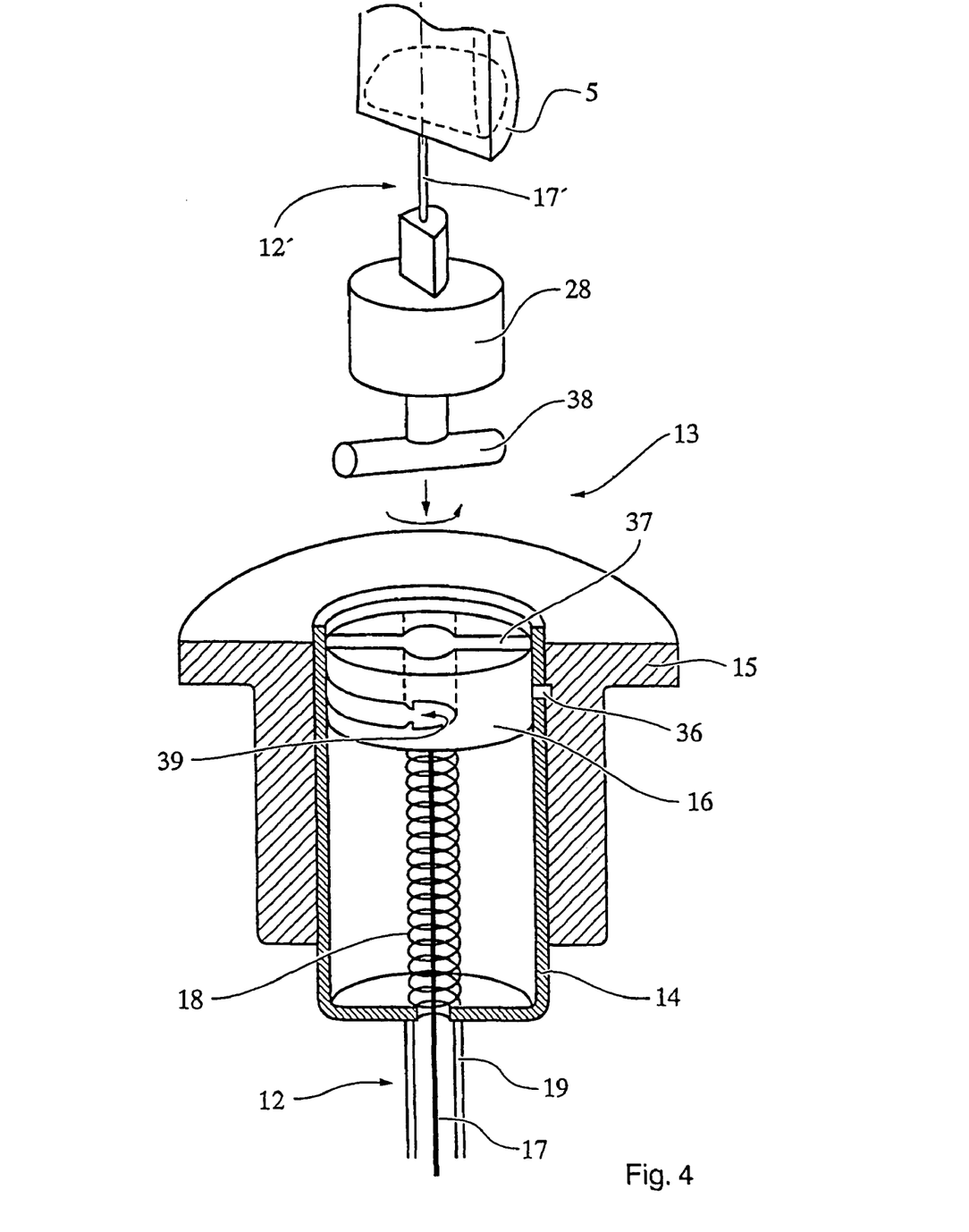
FIG. 4 shows a device for the manual, single connection of the segments of the transmission means.

In the development of the invention shown in FIG. 4, the coupling device 13 comprises a cage 14 which is embedded displaceably in the headrest sleeve 15, but, in the pre-assembled state, is prevented by means of a shearing pin 36, which is integrally formed on the coupling 16, from being displaced together with said coupling. The coupling 16 has an assembly slot 37 which extends transversely over its upper surface side and by means of which a transverse bolt 38 of a guide device 28 connected to the core 17' can be inserted manually into the coupling 16. After rotation of the transverse bolt 38 through 900, the latter is nonreleasably grasped by latching means 39 of the coupling 16. The shearing bolt 36 is subsequently sheared off violently such that the cage 14 and the coupling 16 are displaceable in relation to each other and relative to the headrest sleeve 15. In this case, the holding rod 5 rests on the upper side of the cage 14. The cores 17, 17' are now coupled mechanically to each other.

Figure 5:
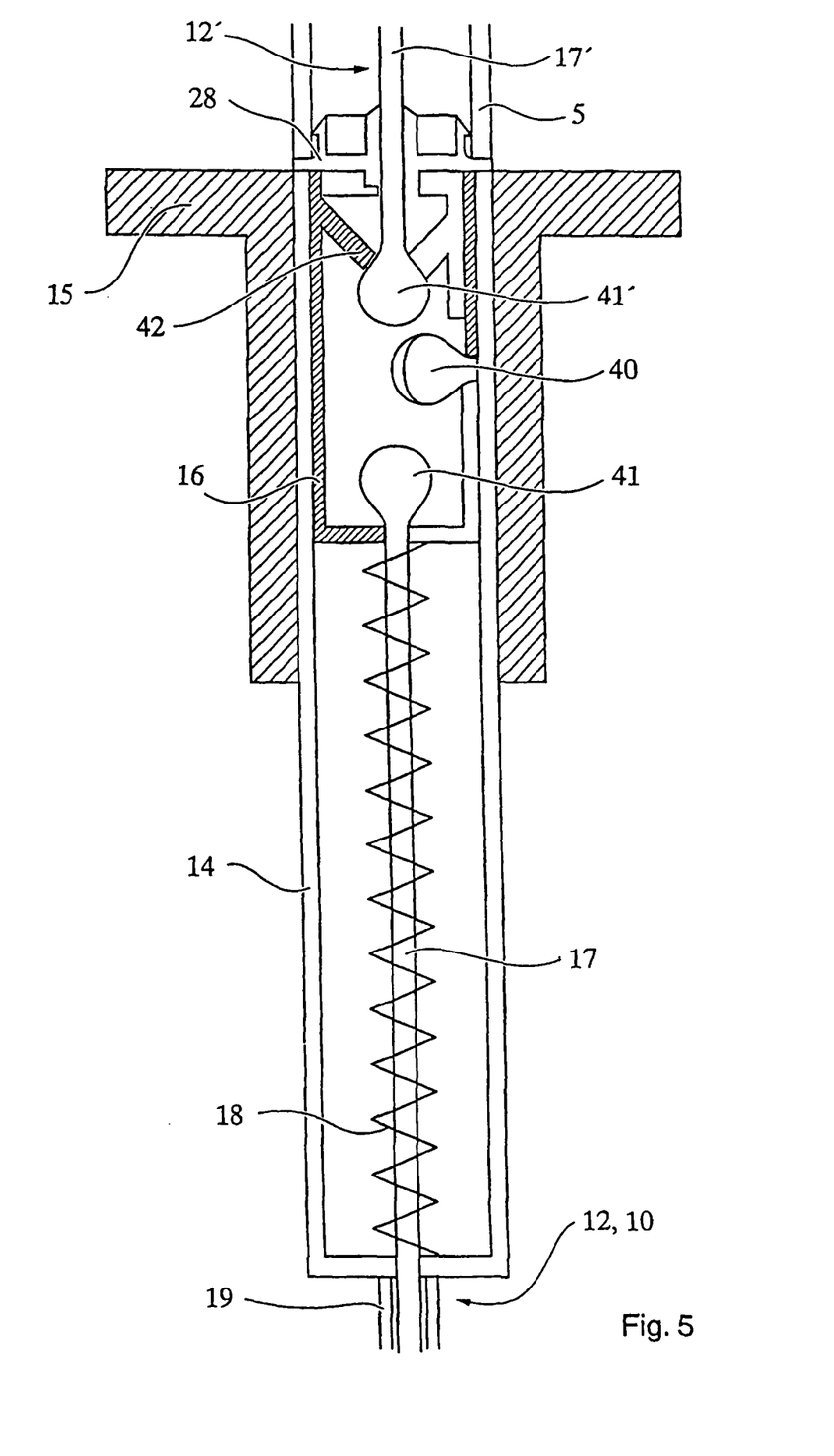
FIG. 5 shows a further apparatus of this type.

The apparatus which is depicted in FIG. 5 and is already finally assembled has a cup-like coupling 16 which, in its radial wall, has a round assembly opening 40 for the previously undertaken insertion of a spherical driver 41 which is integrally formed on the core 17 of the lower segment 12 of the Bowden cable 10 and, in the pre-assembled state, bears against the lower axial wall of the coupling 16. The likewise spherical driver 41' of the opposite core 17' is subsequently introduced from above into the coupling 16 and engaged behind nonreleasably by spring tongues 42 which project obliquely downward from the inner radial wall of the coupling 16 and are formed integrally with the coupling which is injection molded from plastic.

The exemplary embodiments relate to developments of the invention, in which the height adjustment of the headrest takes place by displacement of the holding rods relative to the backrest. However, the invention may, of course, also be used if the holding rods are connected fixedly to the backrest and are displaceable relative to the headrest. In this case, the figures are to be considered turned through 1800 in such a manner that the headrest sleeve is arranged in the headrest itself and not in the backrest.

Reference Numbers

1 Motor vehicle seat
2 Seat part
3 Backrest
4 Headrest
5 Holding rod
6 Basic body 7 Cushion element
8 Driving device
9 Transmission means
10 Bowden cable
11 Actuating device
12, 12' Segment (of the Bowden cable)
13 Coupling device
14 Cage
15 Headrest sleeve
16 Coupling
17 Core (of the Bowden cable)
18 Spring
19 Sheath (of the Bowden cable)
20, 21 Opening
22 Hole
23 Collar
24 Expanding cone
25, 25' Oblique surface
26, 26' Oblique surface
27 Hook
28 Guide device
29, 30 Annular projection
31 Leg spring
32 Latching means
33 Tab
34 Transverse hole
35 Projection
36 Shearing pin
37 Assembly slot
38 Transverse bolt
39 Latching means
40 Assembly opening
41, 41' Driver
42 Spring tongue

The invention claimed is:

1. A backrest for a motor vehicle seat, comprising:
a headrest of which at least one subsection can be shifted from at least one position of use toward the seat occupant's head into a safety position;
an actuating device which is arranged in the backrest and is operatively connected by means of a mechanical transmission means to a driving device for shifting at least one subsection of the headrest, the transmission means having a first segment having an end connected to the actuating device and an opposed end connected to a coupling device, and a second segment having an end connected to the driving device and an opposed end connected to a coupling, the segments being operatively connectable to each other by engaging the coupling device within the coupling in a self-finding manner during the assembly of the headrest so that the first segment and second segment are axially in line with each other.

2. The backrest as claimed in claim 1, wherein the transmission means provides for transmitting tensile movement.

3. The backrest as claimed in claim 1, wherein the transmission means is a Bowden cable.

4. The backrest as claimed in claim 1, wherein the headrest is connected to the backrest in a height-adjustable manner, via holding rods.

5. The backrest as claimed in claim 1, wherein the coupling device can be shifted relative to the backrest or the headrest during the height adjustment of the headrest.

6. The backrest as claimed in claim 1, wherein the coupling device is releasable for the removal of the headrest.

7. The backrest as claimed in claim 1, wherein the coupling device includes a cage which is releaseably coupled to a lower end of a headrest sleeve, the coupling is situated in the cage and having at a first end a wedge-shaped projection connected to an upper end of the first segment via an upwardly tensioned connection, and the coupling having at a second end an opening receiving the second segment, the second segment having a guide device and a hook wherein the hook is configured to expand upon engagement with the wedge-shaped projection.

8. A method for assembling a backrest for a motor vehicle seat, having a headrest of which at least one subsection can be shifted from at least one position of use toward the seat occupant's head into a safety position, and having an actuating means which is arranged in the backrest and is operatively connected by means of a mechanical transmission means to a driving device for shifting at least one subsection of the headrest, the method including the steps of:
attaching a first segment of the transmission means to the actuating means, wherein the first segment has an end connected to the actuating device and an opposed end connected to a coupling device;
attaching a second segment of the transmission means to the driving device, wherein the second segment has an end connected to the driving device and an opposed end connected to a coupling; and
coupling the first and second segments of the transmission means over the course of assembling the headrest on the backrest by engaging a coupling device that is self-finding during the assembly of the headrest so that the first segment and second segment are axially in line with each other.

9. The method as claimed in claim 8, wherein the step of coupling is undertaken when holding rods connecting the headrest and backrest are pushed into the headrest or backrest.

10. The method as set forth in claim 8, wherein the coupling device includes a cage which is releaseably coupled to a lower end of a headrest sleeve, the coupling is situated in the cage and having at a first end a wedge-shaped projection connected to an upper end of the first segment via an upwardly tensioned connection, and the coupling having at a second end an opening receiving the second segment, the second segment having a guide device and a hook wherein the hook is configured to expand upon engagement with the wedge-shaped projection.

11. A backrest for a motor vehicle seat, comprising:
a headrest of which at least one subsection can be shifted from at least one position of use toward the seat occupant's head into a safety position;
an actuating device which is arranged in the backrest and is operatively connected by means of a mechanical transmission means to a driving device for shifting at least one subsection of the headrest, the transmission means having a first segment assigned to the actuating device and a second segment assigned to the driving device, the segments being operatively connectable to each other by means of a coupling device; and wherein the coupling device can be shifted relative to the backrest or the headrest during the height adjustment of the headrest.

12. A method for assembling a backrest for a motor vehicle seat, having a headrest of which at least one subsection can be shifted from at least one position of use toward the seat occupant's head into a safety position, and having an actuating means which is arranged in the backrest and is operatively connected by means of a mechanical transmission means to a driving device for shifting at least one subsection of the headrest, the method including the steps of:
attaching a first segment of the transmission means to the actuating means;

attaching a second segment of the transmission means to the driving device; and coupling the first and second segments of the transmission means over the course of assembling the headrest on the backrest to each other by means of a coupling device, such that the coupling device can be shifted relative to the backrest or the headrest during the height adjustment of the headrest.

* * * * *